(12) United States Patent
Asao (10) Patent No.: US 8,350,151 B2
(45) Date of Patent: Jan. 8, 2013

(54) STUD BOLT ASSEMBLY AND ELECTRICAL JUNCTION BOX EQUIPPED WITH STUD BOLT ASSEMBLY

(75) Inventor: Takahiro Asao, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 301 days.

(21) Appl. No.: 12/878,419

(22) Filed: Sep. 9, 2010

(65) Prior Publication Data

US 2011/0094767 A1  Apr. 28, 2011

(30) Foreign Application Priority Data

Oct. 28, 2009  (JP) ................................. 2009-248264

(51) Int. Cl.
*H02G 3/08*  (2006.01)

(52) U.S. Cl. ......... 174/50; 174/559; 174/520; 439/76.1; 439/76.2

(58) Field of Classification Search .................. 174/50, 174/17 R, 520, 535, 559, 58, 561, 562; 220/3.2, 220/3.3, 3.7, 3.8, 4.02; 439/76.1, 76.2, 949, 439/535; 361/600, 601, 679.01, 730, 752, 361/769; 312/223.2, 223.3, 223.1; 411/366.1; 403/408.1

See application file for complete search history.

(56) References Cited

U.S. PATENT DOCUMENTS

| 4,623,753 | A | * | 11/1986 | Feldman et al. | ................. | 174/50 |
| 6,322,376 | B1 | * | 11/2001 | Jetton | ........................... | 439/76.2 |
| 6,930,248 | B1 | * | 8/2005 | Saka et al. | ....................... | 174/50 |
| 7,394,018 | B2 | * | 7/2008 | Saka et al. | ....................... | 174/50 |
| 7,750,238 | B2 | * | 7/2010 | Kanamaru et al. | ............... | 174/50 |

FOREIGN PATENT DOCUMENTS

| JP | A-8-9535 | 1/1996 |
| JP | A-10-80039 | 3/1998 |
| JP | A-2001-231131 | 8/2001 |
| JP | A-2009-89530 | 4/2009 |

* cited by examiner

*Primary Examiner* — Angel R Estrada
(74) *Attorney, Agent, or Firm* — Oliff & Berridge, PLC (57) ABSTRACT

A stud bolt assembly can couple two electrical conductive members to each other with stability and reliability in connection while avoiding breakage and deformation of the members upon coupling them to each other and an electrical junction box equipped with the stud bolt assembly. Electrical conductive member 24*a* and a connecting terminal 90 are mounted on a shaft portion 44 of a stud bolt 36. The electrical conductive member 24*a* is secured to the connecting terminal 90 by fastening a nut 96 on the shaft portion 44. The stud bolt 36 is displaced in a bolt cover 38 in an axial direction. The electrical conductive member 24*a* and connecting terminal 90 mounted on the shaft portion 44 are firmly and directly fastened between the nut 96 and a distal end surface 50 of a proximal end side projection 48 of the stud bolt 36.

14 Claims, 4 Drawing Sheets

STUD BOLT ASSEMBLY AND ELECTRICAL JUNCTION BOX EQUIPPED WITH STUD BOLT ASSEMBLY

This nonprovisional application claims the benefit of Japanese Patent Application No. 2009-248264 filed on Oct. 28, 2009, the entire disclosure of which is hereby incorporated by reference in its entirety.

BACKGROUND

The exemplary embodiments relates to a stud bolt assembly for coupling two electrical conductive members to each other and also relates to an electrical junction box equipped with the stud bolt assembly.

In related art, an electrical junction box to be used for a wiring operation in a motor vehicle utilizes a stud bolt to couple an electrical power input terminal to an electrical power supply bus bar. The stud bolt is installed in the electrical junction box. The electrical power input terminal and electrical power supply bus bar are secured to the stud bolt by fastening a nut onto the stud bolt, so that these two electrical conductive members are electrically connected to each other.

The stud bolt is fixed in the electrical junction box before hand by means of press fitting or insert molding. Such structure is disclosed in, for example, JP 8 (1996)-9535 A or JP 10 (1998)-80039 A.

SUMMARY

However, since the stud bolt is secured to the electrical junction box by means of press fitting or insert molding in the prior art, there is a possibility of causing a clearance between a coupling surface of the stud bolt and the bus bar. This clearance is caused by a finishing accuracy of the bus bar or an assembling condition of the electrical junction box. At this time, if a nut is forced to be fastened to contact the coupling surface of the stud bolt with the bus bar, an excessive force will need to be applied to a fixing portion between the bus bar and the stud bolt, causing deformation or breakage of the members. There is also a problem that stable connection cannot be obtained between the electrical power input terminal and the electrical power supply bus bar.

Specifically, in the case where the stud bolt is inserted into a bolt fixing aperture in the electrical junction box, and an engaging projection on the bolt fixing aperture engages with an engaging groove in the stud bolt, as shown in FIGS. 1 and 2 in JP 8 (1996)-9535 A, the stud bolt buoys up in a protruding direction by an undue fastening force of the nut, thereby causing breakage of the engaging projection or disengagement of the stud bolt. Also, as shown in FIGS. 1 and 5 in JP 10 (1998)-80039 A, in the case where the stud bolt is provided on a bolt pedestal integrated with the electrical junction box by means of insert molding, an excessive force is applied to the bolt pedestal by an undue fastening force of the nut, thereby causing breakage of the bolt pedestal or deformation of the electrical junction box.

Thus, exemplary embodiments provide a new stud bolt assembly that can couple two electrical conductive members to each other with stability and reliability in connection while avoiding breakage and deformation of the members upon coupling them to each other. Exemplary embodiments provide a new electrical junction box equipped with the stud bolt assembly.

One of the exemplary embodiments is directed to a stud bolt assembly comprising: a stud bolt including a shaft portion and a head portion; a bolt cover including a bottom wall provided in a central part with a receiving aperture and a tubular peripheral wall, the head portion of the stud bolt being contained within the peripheral wall, and the shaft portion of the stud bolt being inserted into the receiving aperture to protrude outward from the receiving aperture; a rotation preventing means for restraining the head portion of the stud bolt from rotating about a center line of the head portion within the peripheral wall; and a play allowable means for restraining an amount of displacement of the stud bolt in an axial direction while preventing the head portion of the stud bolt from disengaging from the peripheral wall of the bolt cover. The shaft portion of the stud bolt is provided on a proximal end with a proximal end side projection that protrudes from a seat surface of the head portion. A distal end surface of the proximal end side projection protrudes from the receiving aperture in the bottom wall of the bolt cover with the shaft portion of the stud bolt protruding at a maximum length in the bolt cover.

According to the stud bolt assembly an exemplary embodiment, when the two electrical conductive members mounted on the shaft portion of the stud bolt are joined to each other by fastening the nut on the shaft portion, the stud bolt is displaced in the axial direction in the bolt cover. Thus, the distal end surface of the proximal end side projection protrudes from the receiving aperture in the bottom wall of the bolt cover, and the two electrical conductive members mounted on the shaft portion can be fastened directly and firmly between the nut and the distal end surface of the proximal end side projection. As a result, when the two electrical conductive members are joined to each other, it is possible to enhance reliability in the connection between the two electrical conductive members and avoid breakage and deformation of a member on which the stud bolt assembly is installed.

Even if finishing accuracy of the electrical conductive members is low and there is a clearance between the mounting member of the stud bolt and the bus bar, the clearance can be absorbed by an allowable displacement of the stud bolt with respect to the bolt cover in the axial direction. The clearance will be eliminated by the axial displacement of the stud bolt in connection with fastening the nut, and it is possible to realize stable metal to metal contact between the coupling surface (the distal end surface of the proximal end side projection) and the bus bar.

A second aspect of the exemplary embodiment is directed to the stud bolt assembly in the first aspect. The peripheral wall of the bolt cover is provided on an inner peripheral surface with an engaging projection. The engaging projection is allowed to elastically deform toward an outer peripheral side of the peripheral wall. The head portion of the stud bolt passes over the engaging projection to be contained in the bolt cover. When the engaging projection returns to an original state by means of elasticity thereof, the head portion of the stud bolt is prevented from disengaging from the bolt cover by the engaging projection.

According to the male connector in the second aspect of the exemplary embodiment, it is possible for a simple structure to hold the stud bolt in the bolt cover so that the stud bolt can move a given distance in the axial direction in the bolt cover and the stud bolt cannot disengage from the bolt cover.

A third aspect of the embodiment is directed to an electrical junction box. In the electrical junction box, a stud bolt is installed, and an electrical conductive member coupled to an electrical power supply circuit is connected to an external connecting terminal. The electrical junction box is provided with a bolt setting aperture. A bolt cover of a stud bolt assembly according to the first or second aspect is contained in the bolt setting aperture so that the bolt cover is restrained from rotating about a center line thereof and restrained from being displaced on the center line. A shaft portion of the stud bolt projects from the bolt setting aperture onto a laying surface of the electrical conductive member. A distal end surface of a proximal end side projection can protrude from the laying surface of the electrical conductive member.

According to the electrical junction box in the third aspect of the exemplary embodiment, even if a clearance is caused between the electrical conductive member and the laying surface, it is possible to contact the distal end surface of the shaft portion with the electrical conductive member by axial displacement of the stud bolt caused in association with fastening the nut on the shaft portion. Thus, it is possible to directly and firmly fasten the connecting terminal and electrical conductive member between the nut and the distal end surface of the proximal end side projection.

A fourth aspect of the exemplary embodiment is directed to the electrical junction box in the third aspect. The stud bolt assembly is contained in the bolt setting aperture so that the stud bolt assembly can move in the aperture by a given distance in an axial direction.

According to the electrical junction box in the fourth aspect of the exemplary embodiment, a clearance is provided between the bolt cover and the bolt receiving aperture in addition to the clearance between the stud bolt and the bolt cover. It is possible to displace not only the stud bolt but also the stud bolt assembly itself in the axial direction upon fastening the nut on the shaft portion of the stud bolt so that the stud bolt assembly can approach the electrical conductive member. Thus, even if a great clearance is caused between the distal end surface of the proximal end side projection and the electrical conductive member before fastening the nut, the clearance is absorbed by axial displacement of the bolt coupling surface. The connecting terminal and electrical conductive member are directly and firmly fastened between the nut and the distal end surface of the proximal end side projection. In result, it is possible to further enhance reliability in the connection between the connecting terminal and the electrical conductive member.

A fifth aspect of the exemplary embodiment is directed to the electrical junction box in the third or fourth aspect. An opening peripheral edge portion around a receiving aperture in a bottom wall of the bolt cover is provided with a collar portion that protrudes outward. The collar portion surrounds the proximal end side projection of the stud bolt. The collar portion extends from the bolt setting aperture exposed on the laying surface.

According to the electrical junction box in the fifth aspect of the exemplary embodiment, the receiving aperture can extend inside the collar portion. Consequently, it is possible to effectively restrain the shaft portion of the stud bolt from slanting.

In exemplary embodiments, the stud bolt is displaced in the axial direction with respect to the bolt cover in connection with fastening the nut on the shaft portion of the stud bolt. Thus, it is possible to ensure metal to metal surface contact between the stud bolt and the electrical conductive member, and enhance reliability in electrical connection.

DETAILED DESCRIPTION OF EMBODIMENTS

Referring now to the drawings, embodiments will be described below.

Figure 1:
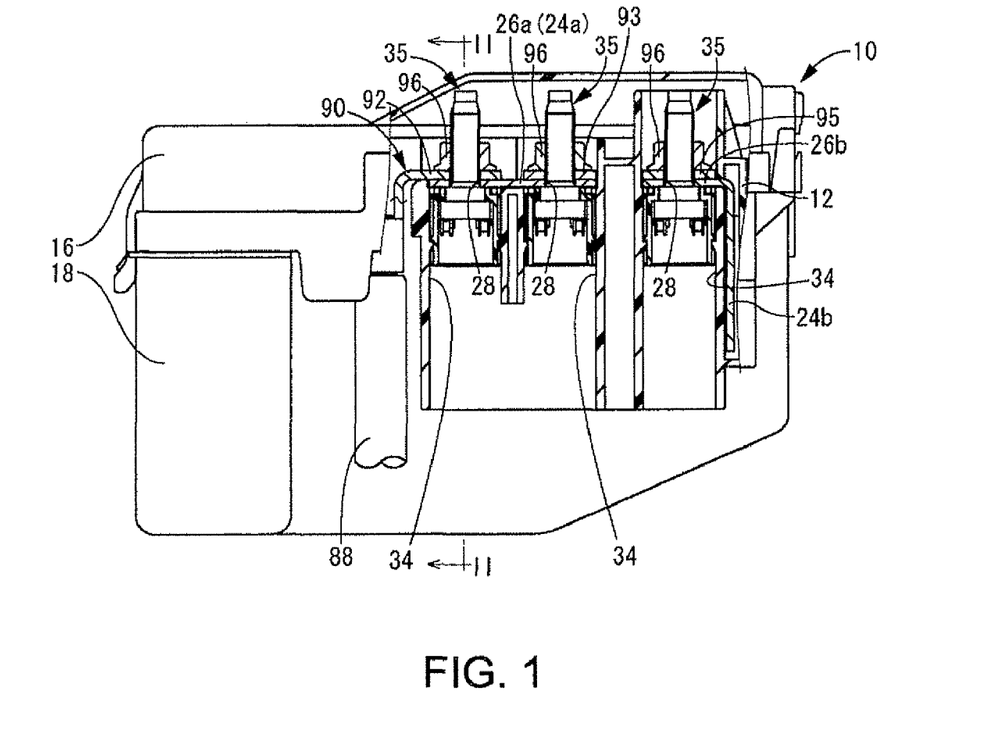
FIG. 1 is a partially broken section view of an embodiment of an electrical junction box in accordance with the exemplary embodiment.
Figure 2:
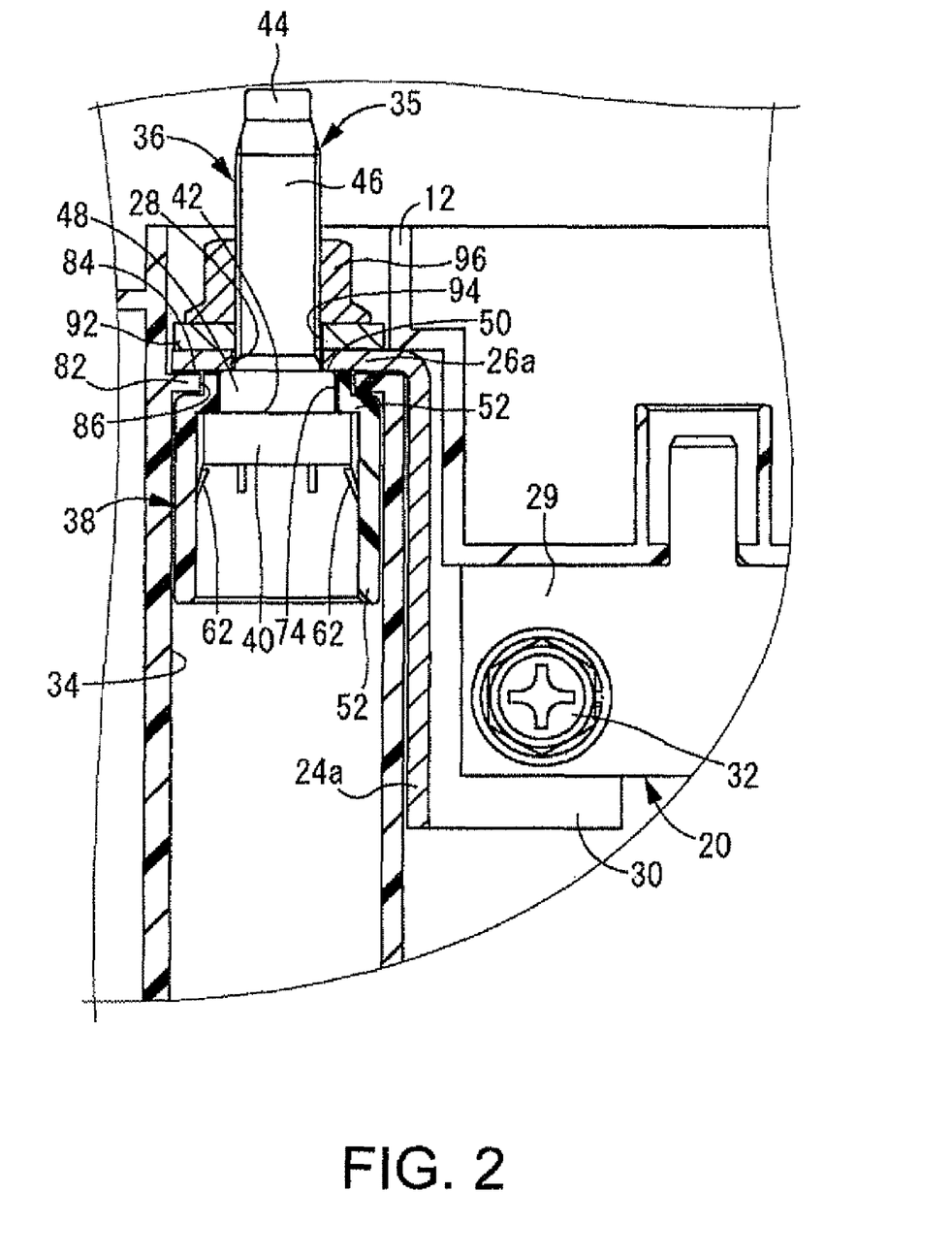
FIG. 2 is an enlarged cross section view taken along lines II-II in FIG. 1, illustrating a main part of the electrical junction box.
Figure 3:
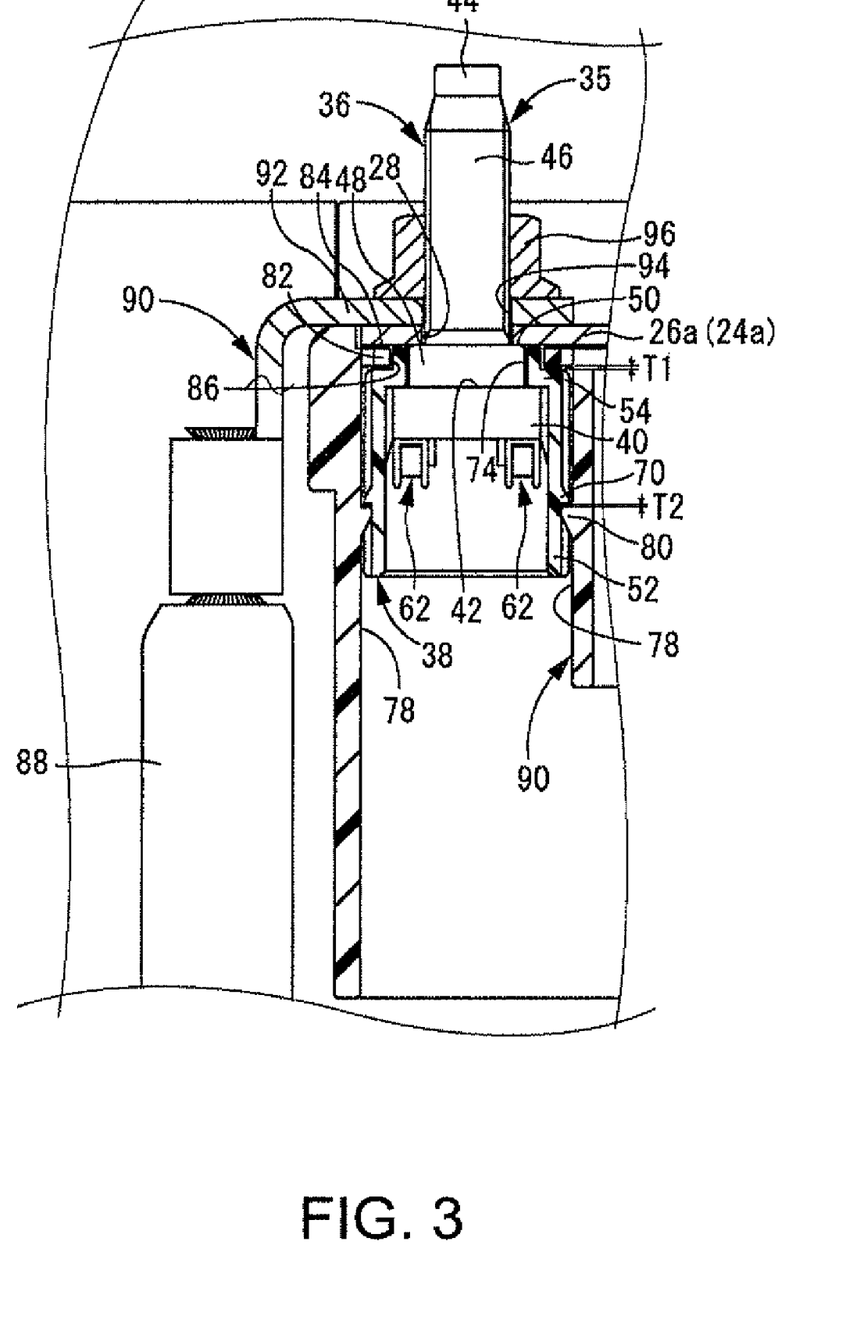
FIG. 3 is an enlarged section view of a main part of the electrical junction box shown in FIG. 1.

FIGS. 1 to 3 show a fuse box 10 that is an embodiment of an electrical junction box. The fuse box 10 includes a casing main body 12, an upper cover 16, and a lower cover 18. The upper and lower covers 16 and 18 are incorporated with the casing main body 12 to form the fuse box 10. Hereinafter, designates the upper and lower directions are defined in a vertical direction, as shown in FIG. 1.

Specifically, electrical parts such as fuses (not shown) are installed in the casing main body 12. The casing main body 12 contains a bus bar circuit 20 that is connected to the electrical parts to constitute an electrical power supply circuit.

Electrical conductive members 24a and 24b are connected to the bus bar circuit 20. The electrical conductive members 24a and 24b are faulted by suitably bending a metallic sheet such as pure copper having a high conductivity. The metallic sheet has a thickness equal to or greater than 2.0 mm (millimeters). Thus, this can restrain the electrical conductive members 24a and 24b from generating heat from flowing electrical currents. The electrical conductive members 24a and 24b are provided with mounting plate portions 26a and 26b that have rectangular thick flat plate configurations. The mounting plate portions 26a and 26b are provided with bolt receiving apertures 28 that extend in a thickness direction. In particular, the mounting plate portion 26a on one electrical conductive member 24a is provided with two bolt receiving apertures 28 that are separated by a suitable distance in a longitudinal direction. The electrical conductive member 24a is provided with a connecting piece 30 to be superimposed on a connecting terminal piece 29 of the bus bar circuit 20 (FIG. 2). When the connecting piece 30 is superimposed on and secured to the bus bar circuit 20 by a bolt 32, the electrical conductive member 24a is electrically connected to the bus bar circuit 20. The electrical conductive member 24b is also electrically connected to the bus bar circuit 20, as is the case with the electrical conductive member 24a, although it is not illustrated in the drawings.

The mounting plate portions 26a and 26b of the electrical conductive members 24a and 24b contact with upper surfaces on bolt setting apertures 34 in the lower cover 18, with the casing main body 12 being contained in and attached to the lower cover 18. The bolt setting apertures 34 contain stud bolt assemblies 35.

Figure 4:
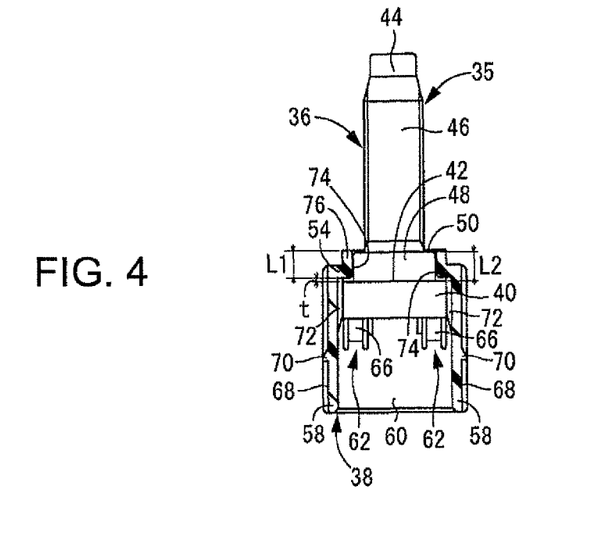
FIG. 4 is a longitudinal section view of a stud bolt assembly in accordance with the exemplary embodiment.

As shown in FIG. 4, each stud bolt assembly 35 includes a stud bolt 36 and a bolt cover 38 that is attached to the stud bolt 36. The stud bolt 36 is provided with a head portion 40. The head portion 40 is provided with a seat surface 42. A shaft portion 44 protrudes from a central part of the seat surface 42.

The head portion 40 is formed into a thick rectangular block configuration. On the other hand, the shaft portion 44 is formed into a substantially column-like configuration. The shaft portion 44 is provided on an intermediate part with threaded portion 46. The shaft portion 44 is provided on a proximal end with a proximal end side projection 48 that has a larger diameter than that of the threaded portion 46. A distal end surface 50 of the proximal end side projection 48 has an annular shape that extends in a direction perpendicular to an axial direction.

Figure 5:
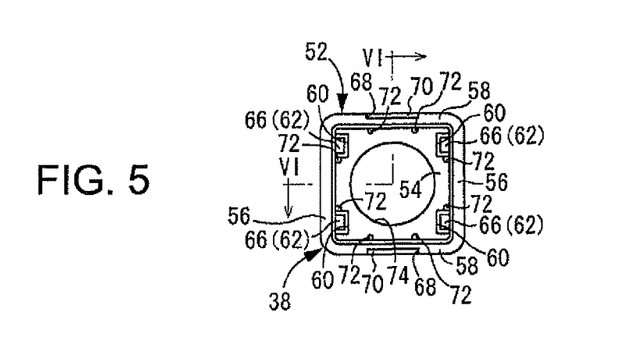
FIG. 5 is a bottom view of a bolt cover constituting the stud bolt assembly shown in FIG. 4.
Figure 6:
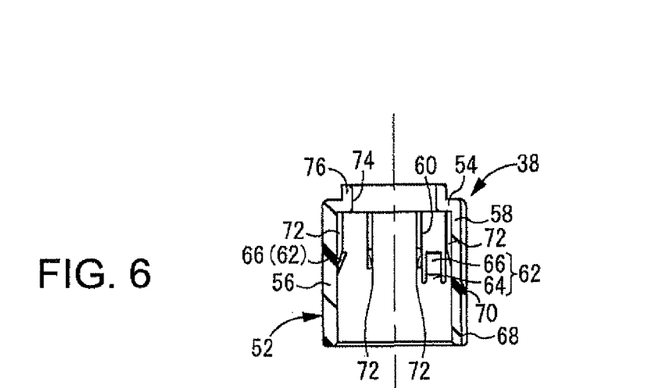
FIG. 6 is a longitudinal section view taken along lines VI-VI in FIG. 5, illustrating the bolt cover.

On the other hand, as shown in FIGS. 5 and 6, the bolt cover 38 includes a peripheral wall 52 and an upper bottom wall 54. The bolt cover 38 is formed into a rectangular box-like configuration that has a space with an opening directed downward. The bolt cover 38 is made of a synthetic resin material.

The peripheral wall 52 includes a pair of side walls 56, 56 that are opposed to each other with respect to a center line extending in a height direction (upper and lower directions) and a pair of side walls 58 that are opposed to each other in a direction orthogonal to the facing direction of the side walls 56. The peripheral wall 52 as a whole is formed into a rectangular tubular configuration extending continuously in a peripheral direction by the side walls 56 and 58.

Each of the side walls 56 is provided with two straight slits 60 each having a substantially constant width and extending in a height direction of the bolt cover 38. The slits 60 extend into the upper bottom wall 54 for the sake of convenience of a mold.

Each slit 60 is provided with an engaging piece 62. The engaging piece 62 is provided with a projecting plate-like portion 64 (FIG. 6) that extends upward in the height direction along the side wall 56. Thus, the engaging piece 62 can be elastically deflected inward and outward from the side wall 56 by means of elasticity (elasticity of synthetic resin) of the projecting plate-like portion 64.

The projecting plate-like portion 64 is provided with a pawl 66 projecting inward from the side wall 56. The pawl 66 is formed into a sawtooth or triangle block configuration that gradually increases a height from the projecting plate-like portion 64 in an upper direction. An upper end surface of the paw 66 extends perpendicular to an inner surface of the side wall.

The pair of side wall 58 are provided on outer side surfaces with guide grooves 68 that have substantially rectangular shapes in cross section and extend straight in the height direction. Each guide groove 68 is provided on a bottom surface with an engaging projection 70 protruding outward in a direction orthogonal to the height direction. The engaging projection 70 is formed into a sawtooth or triangle block-like configuration that increases a height from a bottom surface of the guide groove 68 toward a lower end of the guide groove 68. A lower end surface extends perpendicular to the bottom surface of the guide groove 68.

Each of the side walls 56 and 58 is provided on an inner surface with two guide ribs 72 that serve as a rotation preventing means and extend straight from an upper end of each of the side walls 56 and 58 to an intermediate part in the height direction of the side walls 56 and 58. The guide rib 72 is provided on a lower end with a slant surface that gradually increases a projecting height from the inner surface in an upper direction.

On the other hand, the upper bottom wall 54 extends perpendicularly with a constant thickness in the height direction of the peripheral wall 52 from an upper end of the peripheral wall 52. The upper bottom wall 54 is provided in a central part with a receiving aperture 74 that is a circular shape and extends in a thickness direction of the wall (in the height direction of the peripheral wall 52).

The receiving aperture 74 is provided on an opening peripheral edge with a collar portion 76 (FIG. 4) protruding upward. Thus, the receiving aperture 74 extends to an inner surface of the collar portion 76. As shown in FIG. 4, an axial length L1 of the receiving aperture 74 is set to be smaller than a height L2 of the proximal end side projection 48 of the stud bolt 36.

The stud bolts 36 are installed in the bolt cover 38 constructed above. Specifically, the shaft portion 44 of the stud bolt 36 is inserted into the opening of the space in the bolt cover 38. Thus, the shaft portion 44 is inserted into the receiving aperture 74 in the upper bottom wall 54 from the inside of the bolt cover 38. Consequently, the shaft portion 44 protrudes from the receiving aperture 74 to the outside of the bolt cover 38.

After the shaft portion 44 is inserted into the receiving aperture 74, the head portion 40 is contained within the peripheral wall 52. The head portion 40, that moves in the peripheral wall 52 toward the upper bottom wall 54, contacts the pawl 66 of each engaging piece 62. Each engaging piece 62 decreases a projecting height of each pawl 66 from the inner surface of each side wall 56 by means of the elasticity of each extending plate-like portion 64. This permits the bolt cover 38 to be elastically deformed outward. Consequently, while the head portion 40 is pushing each engaging piece 62 outward, the head portion 40 moves to the upper bottom wall 54.

When the head portion 40 begins to push each engaging piece 62 outward, the head portion 40 begins to contact with the slant surface of each guide rib 72. If a center line of the head portion 40 does not align with a center line of the peripheral wall 52, the head portion 40 moves in the peripheral wall 52 so as to align with their center lines by means of a guide action of the slant surface of each guide rib 72.

When the center line of the head portion 40 aligns with the center line of the peripheral wall 52, all of the guide ribs 72 contact with the head portion 40. Thus, the head 40 is prevented from rotating about the center line.

When the head portion 40 passes over the pawl 66 of each engaging piece 62, the engaging piece 62 returns to its original state due to the elasticity of each extending plate-like portion 64. Thus, the projecting height of each pawl 66 from the inner surface of the side wall 56 returns to its original state. Consequently, a top surface of the head portion 40 is superimposed on an upper end surface of each pawl 66 and the head portion 40 engages with the stud cover 38 so that the head portion 40 does not disengage from the opening of the space in the bolt cover 38.

Under this condition, the proximal end side projection 48 is inserted into the receiving aperture 74. The distal end surface 50 of the proximal end side projection 48 is disposed below the projecting end surface of the collar portion 76. The seat surface 42 of the head portion 40 and the inner surface of the upper bottom wall 54 are opposed to each other in the center line. Consequently, a clearance t (FIG. 4) is defined between the seat surface 42 of the head portion 40 and the inner surface of the upper bottom wall 54. Accordingly, the head portion 40 can move by a distance corresponding to the clearance t in the axial direction. It will be apparent from the above structure that the pawl 66 of each engaging piece 66 and the upper bottom wall 54 of the bolt cover 38 constitute a clearance allowable means. When the head portion 40 contacts with the upper bottom wall 54, the distal end surface 50 of the proximal end side projection 48 is disposed above the projecting end surface of the collar portion 76.

On the other hand, the bolt setting aperture 34 has a rectangular cross section larger than the peripheral wall 52 of the bolt cover 38 and extends straightly in the height direction (upper and lower directions). A pair of inner side surfaces 78 (FIG. 3) opposed to each other in a longitudinal direction (right and left directions in FIG. 1) of the lower cover 18 are provided with engaging projections 80. Each engaging projection 80 is formed into a saw tooth or triangle block configuration that increases a height gradually in an upper direction. An end surface of the engaging projection 80 extends perpendicularly in an opening direction (upper and lower directions) of the bolt setting aperture 34.

The bolt setting aperture 34 is provided on an upper side opening end with a lid plate 82 that has a substantially constant thickness and extends perpendicularly in the opening direction (upper and lower directions). A top surface of the lid plate 82 defines a laying surface 84 for each of the mounting plates 26a and 26b of the electrical conductive members 24a and 24b. The lid plate 82 is provided with a through-hole 86 that is on the same center line as that of the bolt setting aperture 34 and penetrates the lid plate 82 in a thickness direction (in an opening direction of the bolt setting aperture 34). The through-hole 86 is substantially disposed on the same center line as that of the bolt receiving aperture 28 in each of the mounting plate portions 26a and 26b, with the mounting plate portions 26a and 26b being disposed above the bolt setting apertures 34.

Each stud bolt assembly 35 is contained in each bolt setting aperture 34. Specifically, the stud bolt assembly 35 is firstly inserted into the bolt setting aperture 34 so that the shaft portion 44 of each stud bolt 36 is inserted into each bolt setting aperture 34. When each bolt cover 38 moves in each bolt setting aperture 34, each engaging projection 80 provided in the inner peripheral surface of each bolt setting aperture 34 moves in each guide groove 68 in the outer peripheral surface of the bolt cover 38.

Since the engaging projection 80 is disposed in the guide groove 68, the bolt cover 38 is prevented from rotating in the bolt setting aperture 34 about the center line. Thus, the stud bolt 36 is also prevented from rotating in the bolt setting aperture 34 about the center line.

When each engaging projection 70 contacts with each engaging projection 80, the side wall 58 of the bolt cover 38 is deformed inward due to its elasticity. Thus, the engaging projection 70 passes over the engaging projection 80.

When each engaging projection 70 passes over each engaging projection 80, the side wall 58 of the bolt cover 38 returns to the original state by its elasticity. Thus, the lower end surface of the engaging projection 70 is superimposed on the upper end surface of the engaging projection 80, and the engaging projection 70 is engaged with the engaging projection 80. In result, it is possible to prevent each stud bolt assembly 35 from disengaging from each bolt setting apertures 34.

Under this condition, the collar portion 76 is inserted into the through-hole 86 in the lid plate 82. Thus, the collar portion 76 is exposed on the laying surface 84. A projecting end surface of the collar portion 76 is disposed below the laying surface 84.

The shaft portion 44 of each stud bolt 36 projects from the laying surface 84 and is inserted into each of the bolt receiving apertures 28 in the mounting plate portions 26a and 26b. Thus, the electrical conductive members 24a and 24b are mounted on the stud bolt 36. In particular, the electrical conductive member 24a of the mounting plate portion 26a provided with two bolt receiving apertures 28 are attached to two stud bolts 36.

A clearance T1 is defined between each bolt cover 38 and each lid plate 82. Thus, the stud bolt assembly 35 is contained in the bolt setting apertures 34 so that the stud bolt assembly 35 can move by a distance corresponding to the clearance T1 in the axial direction. A size of the clearance T1 upon engagement of the engaging projections 80 and 70, as shown in FIG. 3, is set to be the sum of the clearance T1 between the bolt cover 38 and the lid plate 82 and a clearance T2 between the engaging projections 70 and 80.

As shown in FIG. 3, an electrical power supply terminal 90 crimped on an end of an electrical cable 88 extending from a battery is attached to the stud bolt 36 projecting from one of the mounting plates (the left mounting plate 26a in FIG. 1). On the other hand, a connecting terminal 93 crimped on an end of an electrical cable extending to a starter (not shown) is attached to the stud bolt 36 projecting from the other mounting plate (the right mounting plate 26b in FIG. 1). A connecting terminal 95 crimped on an end of an electrical cable extending to an alternator (not shown) is attached to the stud bolt 36 projecting from the mounting plate 26b. Hereinafter, a coupling structure between the electrical power input terminal 90 and the mounting plate 26a will be explained and explanation of the other terminals 93 and 95 will be omitted, because a coupling structure between the terminals 90, 93, and 95 using the stud bolt assemblies 35 and the mounting plates 26a and 26b are the same respectively.

Firstly, the electrical power input terminal 90 is provided with a contact plate 92 that is electrically connected to the electrical conductive member 24a by being superimposed on the mounting plate 26a of the electrical conductive member 24a. The contact plate 92 is provided with a bolt through-hole 94 that passes the plate in a thickness direction.

Such electrical power input terminal 90 is attached to the stud bolt 36 by inserting the shaft portion 44 of the stud bolt 36 into the bolt through-hole 94 in the contact plate 92. Under this condition, a nut 96 is engaged with the shaft portion 44 of the stud bolt 36. The electrical power input terminal 90 and electrical conductive member 24a are coupled to each other by fastening the nut 96.

Although the stud bolt 36 is allowed to move within the bolt cover 38 in the axial direction inside the fuse box 10, the stud bolt 36 is prevented from rotating about the center lines of the bolt cover 38 and bolt setting aperture 34. Thus, when the nut 96 is further fastened from the condition in which the nut 96 contacts with the electrical power input terminal 90, the stud bolt 36 is moved upward in the axial direction by means of a thread feeding action between the nut 96 and the threaded portion 46 of the stud bolt 36. Consequently, the head portion 40 contacts with the upper bottom wall 54, and the distal end surface 50 of the proximal end side projection 48 is disposed above the projecting end surface of the collar portion 76.

Since the stud bolt assembly 35 is permitted to move in the bolt setting apertures 34 in the axial direction, the stud bolt assembly 35 itself moves upward when the nut 96 is further fastened from the state in which the head portion 40 contacts with the upper bottom wall 54. Consequently, as shown in FIG. 3, the clearance T2 is defined between the lower end surface of the engaging projection 70 and the upper end surface of the engaging projection 80. In association with the clearance T2, the clearance T1 between the bolt cover 38 and the lid plate 82 becomes small.

Under this condition, the distal end surface 50 of the proximal end side projection 48 is disposed above the laying surface 84. Thus, the contact plate 92 of the electrical power input terminal 90 and mounting plate 26a of the electrical conductive member 24a are directly fastened in a manner of a mutual metal surface contact between the nut 96 and the distal end surface 50 of the proximal end side projection 48. In result, the electrical power input terminal 90 and electrical conductive member 24a are electrically and firmly connected to each other.

In the fuse box 10 described above, the stud bolt 36 is allowed to move in the axial direction, and the distal end surface 50 of the proximal end side projection 48 can protrude upward over the laying surface 84. Thus, even if the mounting plate 26a has a thickness equal to or more than 2.0 mm (millimeters) that is hard in deflection, it is possible to directly fasten the contact plate 92 and mounting plate portion 26a between the nut 96 and the distal end surface 50 of the proximal end side projection 48. As a result, while avoiding breakage or deformation of the lower cover 18 due to undue fastening of the nut 96, surface contact between the contact plate 92 and the mounting plate portion 26a can be achieved, enhancing the reliability of the in electrical connection between the electrical power input terminal 90 and the electrical conductive member 24a.

Since the stud bolt assembly 35 is allowed to move in the axial direction, an amount of movement of the stud bolt 36 in the axial direction becomes larger. Accordingly, even if a great clearance is caused between the mounting plate portion 26a and the laying surface 84 on account of finishing accuracy of the electrical conductive member 26a or assembling condition between the casing main body 12 and the lower cover 18, it is possible to contact the distal end surface 50 of the proximal end side projection 48 with the mounting plate portion 26a. Consequently, it is possible to effectively prevent the lower cover 18 from causing breakage or deformation by undue fastening of the nut 96. It is also possible to further enhance reliability in connection between the electrical power input terminal 90 and the electrical conductive member 24a.

The mounting plate portion 26a of the electrical conductive member 24a and the connecting plate 92 of the electrical power input terminal 90 are directly superimposed on each other. Thus, it is possible to directly flow an electrical current from the electrical power input terminal 90 to the electrical conductive member 24a without interposing the stud bolt 36. As a result, it is possible to enhance efficiency in the electrical current carrying to the electrical conductive member 24a.

Since coupling between the electrical power input terminal 90 and the electrical conductive member 24a is carried out by merely fastening the nut 96 screwed on the shaft portion 44 of the stud bolt 36, it is possible to shorten a period in time required for fastening the electrical power input terminal 90 and electrical conductive member 24a.

Although the embodiments are described above, the exemplary embodiment is not limited to the above features. For example, the electrical conductive member may be a bus bar having a general size in thickness (0.8 mm or 0, 64 mm).

The bolt cover constituting the stud bolt assembly may be secured to various kinds of bolt fixing sections such as electrical junction boxes, or vehicle body panels by a well known conventional means such as an adhesive, a bolt, a male and female fitting, and can be utilized in a bolt fastening structure between members. Similarly, the bolt setting aperture may be provided in a member such as a vehicle body panel or a bracket as well as the electrical junction box.

The bolt cover provided with no guide rib 72 can be adopted in the above embodiment. If such bolt cover is adopted, in the case where there is a clearance between the outer peripheral surface of the collar portion 76 and the inner peripheral surface of the receiving aperture 74, it is possible to displace the stud bolt 36 from the bolt cover 38 in an orthogonal direction. In result, even if the bolt receiving aperture 28 does not accord with the receiving aperture 74 on the center line on account of the finished accuracy of the electrical conductive members 24a and 24b or accuracy in assembly of the lower cover 18 onto the casing main body 12, it is possible to insert the stud bolt 36 into the bolt receiving aperture 28. In particular, since two bolt receiving apertures 28 are provided in the mounting plate portion 26a of one electrical conductive member 24a, any stud bolt 36 can be inserted into the bolt receiving aperture 28 by displacement of the stud bolt 36 in the orthogonal direction, although a mutual position between the bolt receiving aperture 28 and the receiving aperture 74 is likely to be deviated. The head portion 40 and peripheral wall 52 constitute a rotation preventing means in the above bolt cover.

What is claimed is:

1. A stud bolt assembly comprising:
   a stud bolt having a shaft portion and a head portion, the head portion having a seat surface and the shaft portion having a proximal end side projection that protrudes from the seat surface;
   a bolt cover including a bottom wall and a tubular peripheral wall, the bottom wall being provided with a receiving aperture in a central part of the bottom wall, the head portion of the stud bolt being contained within the peripheral wall, and the shaft portion of the stud bolt being inserted into the receiving aperture such that the shaft portion of the stud bolt protrudes outward from the receiving aperture;
   a rotation preventing means for restraining the head portion of the stud bolt from rotating about a center line of the head portion within the peripheral wall; and
   a play allowable means for restraining an amount of displacement of the stud bolt in an axial direction while preventing the head portion of the stud bolt from disengaging from the peripheral wall of the bolt cover;
   a distal end surface of the proximal end side projection protruding from the receiving aperture in the bottom wall of the bolt cover with the shaft portion of the stud bolt protruding at a maximum length from the bolt cover.

2. The stud bolt assembly according to claim 1, wherein
   the peripheral wall of the bolt cover is provided on an inner peripheral surface with an engaging projection, the engaging projection being configured to elastically deform toward an outer peripheral side of the peripheral wall,
   the head portion of the stud bolt passing over the engaging projection to be contained within the bolt cover, and
   under the condition that the engaging projection returns to an original state by means of elasticity, the head portion of the stud bolt is prevented from disengaging from the bolt cover by the engaging projection.

3. An electrical junction box wherein the stud bolt assembly of claim 1 is installed, and an electrical conductive member coupled to an electrical power supply circuit is connected to an external connecting terminal, the electrical conductive member having a laying surface, the electrical junction box comprising:
   a first side wall and a second side wall, the first side wall and the second side wall defining a bolt setting aperture,
   the bolt cover being contained in the bolt setting aperture so that the bolt cover is restrained from rotating about a center line thereof and from being displaced on the center line,
   the shaft portion of the stud bolt projecting from the bolt setting aperture onto the laying surface of the electrical conductive member, and
   the distal end surface of a proximal end side projection being configured to protrude on the laying surface of the electrical conductive member.

4. The electrical junction box according to claim 3, wherein the stud bolt assembly is contained in the bolt setting aperture so that the stud bolt assembly can move in the aperture by a given distance in an axial direction.

5. The electrical junction box according to claim 3, wherein an opening peripheral edge portion around a receiving aperture in a bottom wall of the bolt cover is provided with a collar portion that protrudes outward, the collar portion surrounds the proximal end side projection of the stud bolt, the collar portion extending from the bolt setting aperture being exposed on the laying surface.

6. A stud bolt assembly comprising:
- a stud bolt having a shaft portion and a head portion, the head portion having a seat surface and the shaft portion having a proximal end side projection that protrudes from the seat surface, the proximal end side projection having a distal end;
- a bolt cover including a bottom wall and a tubular peripheral wall, the bottom wall being provided with a receiving aperture in a central part of the bottom wall, the distal end of the proximal end side projection protruding from the receiving aperture,
- the head portion of the stud bolt being contained within the peripheral wall and engaging the peripheral wall, and the stud bolt being disposed in the receiving aperture such that the shaft portion of the stud bolt protrudes outward from the receiving aperture; and
- a play allowable piece that restrains a displacement of the stud bolt in an axial direction, and that prevents the head portion of the stud bolt from disengaging the peripheral wall of the bolt cover.

7. The stud bolt assembly of claim 6, further comprising:
a rotation preventing piece that restrains the head portion of the stud bolt from rotating about a center line of the head portion within the peripheral wall.

8. The stud bolt assembly of claim 6, wherein the shaft portion of the stud bolt protrudes at a maximum length in the bolt cover.

9. The stud bolt assembly of claim 6, the play allowable piece extending from an inner side surface of the peripheral wall and having elasticity.

10. The stud bolt assembly of claim 6, the play allowable piece extending from the peripheral wall in a direction of the shaft portion.

11. The stud bolt assembly of claim 6, the play allowable piece being integrally formed with the peripheral wall.

12. The stud bolt assembly of claim 6, the play allowable piece including a plurality of first engaging projections provided on an exterior of the peripheral wall.

13. The stud bolt assembly of claim 12, the play allowable piece including a plurality of second engaging projections, each of the second engaging projections being in contact with a corresponding first engaging projection.

14. The stud bolt assembly according to claim 6, wherein
- the peripheral wall of the bolt cover is provided on an inner peripheral surface with an engaging projection, the engaging projection being configured to elastically deform toward an outer peripheral side of the peripheral wall,
- the head portion of the stud bolt passing over the engaging projection to be contained within the bolt cover, and
- under the condition that the engaging projection returns to an original state by means of elasticity, the head portion of the stud bolt is prevented from disengaging from the bolt cover by the engaging projection.

* * * * *